(12) United States Patent
Kanegsberg

(10) Patent No.: US 7,936,169 B2
(45) Date of Patent: May 3, 2011

(54) POLARIZATION ANALYZER ORIENTATION WITH NUCLEAR MAGNETIC RESONANCE GYROSCOPE

(75) Inventor: Edward Kanegsberg, Pacific Palisades, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 303 days.

(21) Appl. No.: 12/218,298

(22) Filed: Jul. 14, 2008

(65) Prior Publication Data
US 2010/0007345 A1 Jan. 14, 2010

(51) Int. Cl.
*G01V 3/00* (2006.01)
(52) U.S. Cl. ........ 324/305; 324/300; 324/301; 324/302; 324/304; 324/319
(58) Field of Classification Search .......... 324/300–322; 600/407–435; 356/301, 492, 521
See application file for complete search history.

(56) References Cited

U.S. PATENT DOCUMENTS

| | | | | |
|---|---|---|---|---|
| 3,491,286 A * | 1/1970 | Simpson | .................. | 324/304 |
| 3,524,127 A * | 8/1970 | Greenwood, Jr. et al. | .... | 324/304 |
| 3,546,575 A * | 12/1970 | Jeffries et al. | .................. | 324/304 |
| 3,778,700 A * | 12/1973 | Bayley et al. | .................. | 324/304 |
| 4,157,495 A | 6/1979 | Grover et al. | | |
| 4,403,190 A * | 9/1983 | Greenwood | .................. | 324/304 |
| 5,530,545 A | 6/1996 | Pavlath | | |
| 7,038,450 B2 * | 5/2006 | Romalis et al. | .............. | 324/304 |
| 7,145,333 B2 * | 12/2006 | Romalis et al. | .............. | 324/304 |
| 7,282,910 B1 | 10/2007 | Kanegsberg | | |
| 7,286,222 B2 * | 10/2007 | Gardner, Jr. | .................. | 356/301 |
| 7,460,248 B2 * | 12/2008 | Kurtz et al. | .................. | 356/521 |
| 7,542,138 B2 * | 6/2009 | Gardner, Jr. | .................. | 356/301 |
| 7,872,473 B2 * | 1/2011 | Kitching et al. | .............. | 324/305 |
| 2002/0044353 A1 * | 4/2002 | Salzman | ...................... | 359/488 |
| 2002/0114032 A1 * | 8/2002 | Salzman | ...................... | 359/122 |
| 2004/0140799 A1 * | 7/2004 | Romalis et al. | .............. | 324/301 |
| 2005/0206377 A1 * | 9/2005 | Romalis et al. | .............. | 324/301 |
| 2007/0263226 A1 * | 11/2007 | Kurtz et al. | .................. | 356/492 |
| 2009/0039881 A1 * | 2/2009 | Kitching et al. | .............. | 324/304 |
| 2010/0007345 A1 * | 1/2010 | Kanegsberg | .................. | 324/304 |

* cited by examiner

*Primary Examiner* — Melissa J Koval
*Assistant Examiner* — Tiffany A Fetzner
(74) *Attorney, Agent, or Firm* — Carmen Patti Law Group, LL

(57) ABSTRACT

An apparatus in one example comprises a polarization filter and a polarization analyzer. The polarization filter comprises a first polarization axis. The polarization analyzer comprises a second polarization axis. The polarization filter is configured to polarize detection light for a nuclear magnetic resonance (NMR) cell along the first polarization axis. The polarization analyzer is configured to receive the detection light from the NMR cell and pass a portion of the detection light to a processor for determination of angular rate information. The portion of the detection light passed to the processor is based on an orientation of the second polarization axis relative to the first polarization axis. The orientation is selected to maximize a signal-to-noise ratio of the detection light.

12 Claims, 2 Drawing Sheets

POLARIZATION ANALYZER ORIENTATION WITH NUCLEAR MAGNETIC RESONANCE GYROSCOPE

TECHNICAL FIELD

The invention relates generally to nuclear magnetic resonance and more particularly to nuclear magnetic resonance gyroscopes.

BACKGROUND

A nuclear magnetic resonance (hereinafter referred to as NMR) angular rate sensor or gyroscope is described in U.S. Pat. No. 4,157,495, the disclosure of which is hereby incorporated by reference into this document. A NMR gyroscope operates on the principle of sensing inertial angular rotation rate or angular displacement about a sensitive axis of the device as a shift in the Larmor precession frequency or phase, respectively, of one or more isotopes that possess nuclear magnetic moments.

The gyroscope is composed of an angular rotation sensor and associated electronics. The principal elements of the sensor are one or more light sources, an NMR cell, one or more photodetectors, a set of magnetic shields and a set of magnetic field coils. The principal elements of the electronics are signal processing circuits for extracting the Larmor precession frequency and phase information as well as circuits for generating and controlling various magnetic fields, both steady and varying sinusoidally with time, that are necessary for the proper operation of the device.

The NMR cell is mounted within a set of magnetic shields in order to attenuate external magnetic fields to acceptable low levels. Magnetic field coils are used to apply very uniform magnetic fields to the NMR cell. Both a steady field and an ac carrier field are applied along the sensitive axis of the device and AC feedback fields are applied along one of the transverse axes. The DC magnetic fields along both transverse axes are controlled to be substantially zero. The NMR cell contains one or more alkali metal vapors, such as rubidium, together with two or more isotopes of one or more noble gases that possess nuclear magnetic moments, such as krypton-83, and xenon-129, or xenon-131. One or more buffer gases such as helium and nitrogen may also be contained in the cell. The magnitude of an individual nuclear magnetic moment is extremely small and the natural equilibrium condition is one in which a nearly random orientation of moments exists in an ensemble of atoms. Techniques must be used to orient a significant fraction of these magnetic moments in a single direction so that a macroscopic magnetic moment, and consequently a measurable signal, will be produced. The NMR cell is illuminated by a beam of circularly polarized light that originates from a source such as a rubidium lamp or laser diode and which passes through the cell at an angle with respect to the steady magnetic field. Absorption of some of this light causes the atomic magnetic moments of the rubidium atoms to be partly aligned in the direction of the steady magnetic field. This alignment is partly transferred to the nuclear magnetic moments of the noble gases by interatomic interactions, and these nuclear moments, and associated nuclear moment magnetic fields, are caused to precess about the direction of the steady magnetic field at the respective Larmor precession frequencies of the two noble gases. These rotating fields modulate the precessional motions of the rubidium magnetic moments, which in turn produce corresponding modulations of the transmitted light, thereby making it possible to optically detect the Larmor precession frequencies of the two noble gases.

The modulations of the light intensity are converted into electrical signals by a photodetector, and these signals are then electronically demodulated and filtered to provide signals at the Larmor precession frequencies of the two noble gases. The difference between the two precession frequencies is used to accurately control the steady magnetic field so that it is constant. One of the noble gas precession frequencies is subtracted from a precision reference frequency. The resulting difference frequency is a measure of the angular rotation rate of the gyroscope.

SUMMARY

The invention in one implementation encompasses an apparatus. The apparatus comprises a polarization filter and a polarization analyzer. The polarization filter comprises a first polarization axis. The polarization analyzer comprises a second polarization axis. The polarization filter is configured to polarize detection light for a nuclear magnetic resonance (NMR) cell along the first polarization axis. The polarization analyzer is configured to receive the detection light from the NMR cell and pass a portion of the detection light to a processor for determination of angular rate information. The portion of the detection light passed to the processor is based on an orientation of the second polarization axis relative to the first polarization axis. The orientation is selected to maximize a signal-to-noise ratio of the detection light.

Another implementation of the invention encompasses a method. Detection light for a nuclear magnetic resonance (NMR) cell is polarized with a polarization filter. The polarization filter comprises a first polarization axis. The detection light from the polarization filter is passed through the NMR cell to a polarization analyzer. The detection light from the NMR cell is polarized with the polarization analyzer. The polarization analyzer comprises a second polarization axis. The polarization analyzer is oriented to change an orientation angle between the first polarization angle and the second polarization angle to maximize a signal-to-noise ratio of the detection light.

A further implementation of the invention encompasses an article. The article comprises one or more computer-readable signal-bearing media. The article comprises means in the one or more media for polarizing detection light for a nuclear magnetic resonance (NMR) cell with a polarization filter. The polarization filter comprises a first polarization axis. The article further comprises means in the one or more media passing the detection light from the polarization filter through the NMR cell to a polarization analyzer. The article comprises means in the one or more media polarizing the detection light from the NMR cell with the polarization analyzer. The polarization analyzer comprises a second polarization axis. The article further comprises means in the one or more media orienting the polarization analyzer to change an orientation angle between the first polarization angle and the second polarization angle to maximize a signal-to-noise ratio of the detection light.

DESCRIPTION OF THE DRAWINGS

Features of various implementations of the invention will become apparent from the description, the claims, and the accompanying drawings in which:

DETAILED DESCRIPTION

Figure 1:
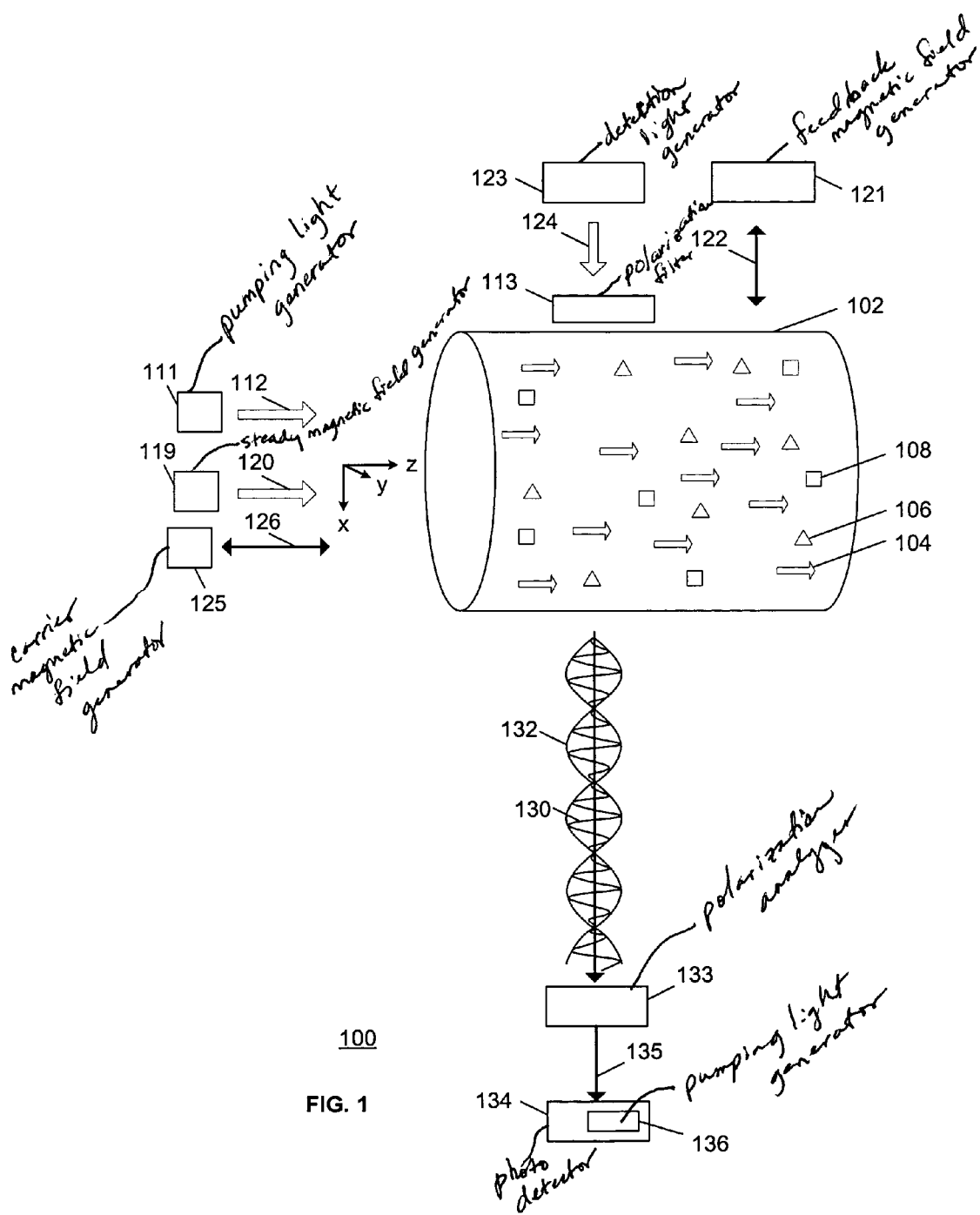
FIG. 1 is a representation of one implementation of an apparatus that comprises a nuclear magnetic resonance cell, a polarization filter, a polarization analyzer, and a photodetector.

Turning to the figure, an apparatus 100 in one example comprises a nuclear magnetic resonance ("NMR") gyroscope. The apparatus 100 comprises a NMR cell 102, a pumping light generator 111, a polarization filter 113, a steady magnetic field generator 119, a feedback magnetic field generator 121, a detection light generator 123, a carrier magnetic field generator 125, a polarization analyzer 133, and a processor 134. The NMR cell 102 comprises at least one optically pumpable substance, for example, an alkali metal vapor 104. The NMR cell 102 also comprises first and second nuclear magnetic moment gases 106 and 108. Examples of the alkali metal vapor 104 comprise rubidium and cesium. Other alkali metals such as potassium may also be applicable. The nuclear magnetic moment gases 106 and 108 in one example comprise isotopes of noble gases such as xenon and/or krypton. The NMR cell 102 in a further example comprises at least one buffer gas, such as helium or nitrogen. The processor 134 in one example comprises an instance of a computer-readable signal bearing medium 136.

An illustrative description of operation of the apparatus 100 is presented, for explanatory purposes. The pumping light generator 111 directs optical pumping light 112 into the NMR cell 102 along the z-axis. The optical pumping light 112 in one example comprises polarized light. The steady magnetic field generator 119 applies a steady magnetic field 120 along the z-axis. The optical pumping light 112 and the steady magnetic field 120 cooperate to align magnetic moments of atoms of the alkali metal vapor 104 in the z-direction. The atoms of the alkali metal vapor 104 transfer the magnetic moment alignment to nuclei of the nuclear magnetic moment gases 106 and 108 through interatomic collisions.

The feedback magnetic field generator 121 applies a sinusoidal AC feedback magnetic field 122 in the x-direction and serves to torque the magnetic moment of the nuclear magnetic moment gases 106 and 108 to the x-y plane. The sinusoidal AC feedback magnetic field 122 comprises a plurality of feedback signals of different frequencies that are superimposed, for example, one feedback signal per nuclear magnetic moment gas. The frequency and phase of each signal are matched to a Larmor precession frequency of collective magnetic moments of the respective nuclear magnetic moment gases 106 and 108. The collective magnetic moments of the nuclear magnetic moment gases 106 and 108 then precess in the x-y plane at their Larmor precession frequencies $\omega_a$ and $\omega_b$ about the steady magnetic field 120. The precessing nuclear magnetic moments create nuclear precession magnetic fields of strength $h_a$ and $h_b$ that rotate in the x-y plane and which therefore have a component in the y-direction that is equal to $h_a \cos \omega_a t$ and $h_b \cos \omega_b t$.

The detection light generator 123 directs detection light 124 through the polarization filter 113 and the nuclear magnetic resonance cell 102. The polarization filter 113 polarizes the detection light 124 before reaching the NMR cell 102. In the implementation shown, the polarization filter 113 linearly polarizes the detection light 124. The detection light 124 interacts with the atoms of the alkali vapor 104, which are under the influence of the steady magnetic field 120, a superimposed AC carrier magnetic field 126, and the y-component of the nuclear precession fields $h_a$ and $h_b$. The carrier magnetic field generator 125 applies the superimposed AC carrier magnetic field 126. The superimposed AC carrier magnetic field comprises a frequency of $\omega$, which is close to the Larmor precession frequency for an alkali magnetic moment of the alkali metal vapor 104. This interaction of the detection light 124 and the alkali vapor 104 causes the polarization of the x-component of transmitted light 130 to be modulated at the precession frequency $\omega$, with a modulation envelope 132 at the nuclear precession frequencies $\omega_a$ and $\omega_b$. For example, the polarization modulation of the transmitted light 130 comprises the superimposed AC carrier magnetic field that comprises the nuclear precession frequencies $\omega_a$ and $\omega_b$ as sidebands.

The polarization analyzer 133 receives the detection light 130 from the NMR cell 102 and passes a portion of the detection light 130 through to the processor 134. The polarization modulation of the detection light 130 is converted by the polarization analyzer 133 so that detection light 135 comprises an intensity modulation (e.g., amplitude modulation). The intensity of both the detection light 135 and the light modulation that reaches the processor 134 is based on an orientation angle of the polarization analyzer 133 relative to the polarization filter 113. The processor 134 in one example employs a silicon photodetector to receive and convert the transmitted light 130 into electrical signals. The processor 134 then processes the electrical signals to obtain angular rate information for the apparatus 100, as will be appreciated by those skilled in the art. The computer-readable signal bearing medium 136 of the silicon photodetector 134 in one example comprises software, firmware, and/or other executable code for processing the electrical signals.

Figure 2:
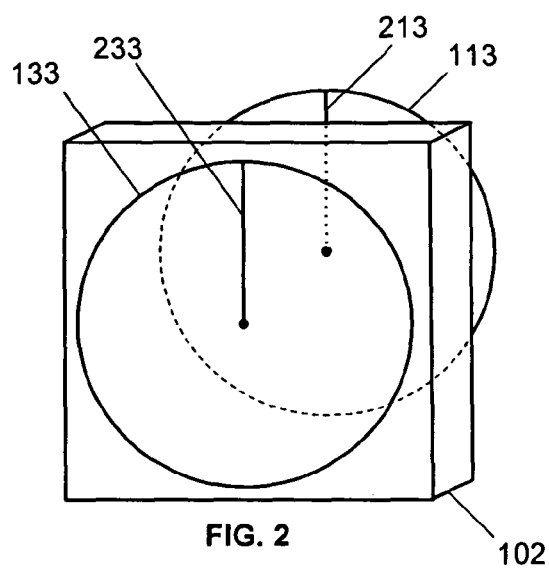
FIG. 2 is a perspective view of the apparatus of FIG. 1, further illustrating an orientation angle of 0 degrees between the polarization filter and the polarization analyzer.
Figure 3:
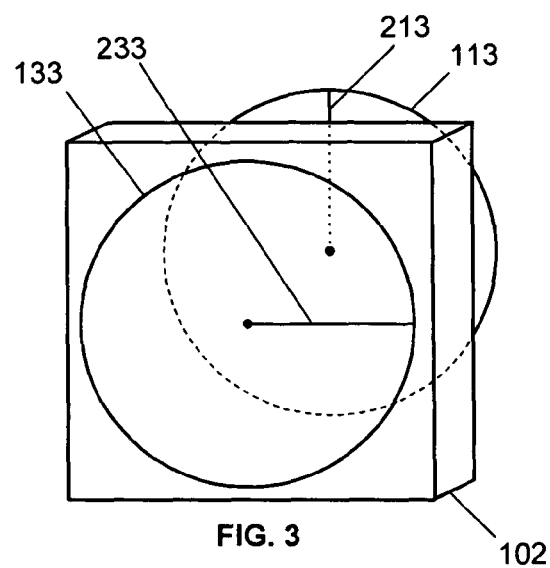
FIG. 3 is a perspective view of the apparatus of FIG. 1, further illustrating an orientation angle of 90 degrees between the polarization filter and the polarization analyzer.

The electrical signals comprise white shot noise and random intensity noise which degrade the signal quality, for example, a signal to noise ratio of the electrical signal. An orientation of the polarization analyzer 133 relative to the polarization filter 113 affects the electrical signal strength. Turning to FIGS. 2-5, the polarization filter 113 comprises a polarization axis 213 and the polarization analyzer 133 comprises a polarization axis 233. The polarization filter 113 polarizes the detection light 124 along its polarization axis 213. Referring to FIG. 2, if the polarization axes 213 and 233 are parallel to each other, the detection light 130 passes through the polarization analyzer 133, substantially unobstructed. Referring to FIG. 3, if the polarization axes 213 and 233 are perpendicular, the detection light 130 is blocked, as will be appreciated by those skilled in the art.

Figure 4:
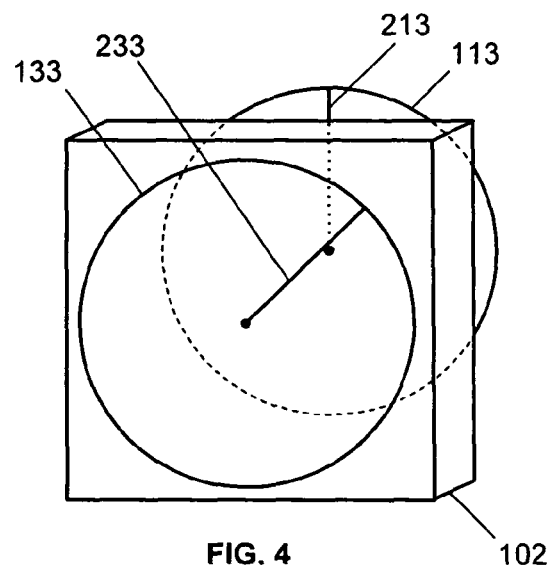
FIG. 4 is a perspective view of the apparatus of FIG. 1, further illustrating an orientation angle of 45 degrees between the polarization filter and the polarization analyzer.

Referring to FIG. 4, in some previous implementations the orientation axis 233 of the polarization analyzer 133 was at approximately 45 degrees relative to the polarization filter 113. In this orientation, approximately 50% of the detection light 130 is blocked by the polarization analyzer 133 and the remaining 50% of the detection light 130 reaches the processor 134. This provides a maximum modulation of the polarization axis by the precessing nuclear moments since a slope of the response curve (which is a sinusoid) is maximized at a 45 degree analyzer orientation angle. The white shot noise is proportional to the square root of photon flux (i.e., light intensity) of the detection light 130. Also, the random intensity noise is proportional to the photon flux of the detection light 130.

Figure 5:
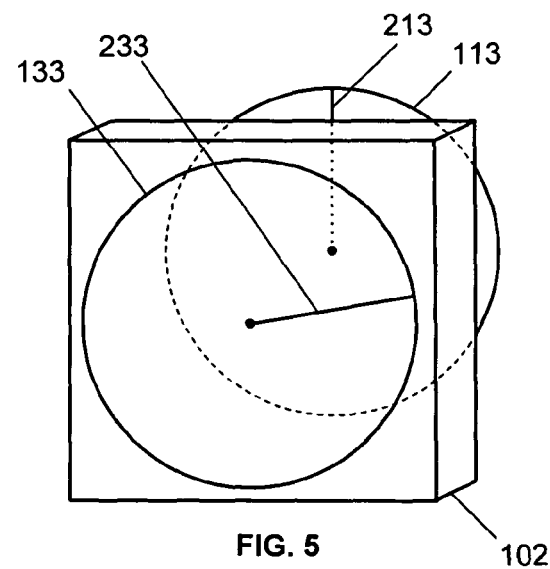
FIG. 5 is a perspective view of the apparatus of FIG. 1, further illustrating an orientation angle of 80 degrees between the polarization filter and the polarization analyzer.

While a reduction in photon flux reduces a signal level for the calculation of the angular rate information, it also causes a reduction in the magnitude of the white shot noise and the random intensity noise. However, the magnitude of the white shot noise and the random intensity noise decreases faster than the signal level as the orientation angle is increased. This results in a lower signal level, but a higher signal-to-noise ratio, as will be appreciated by those skilled in the art. A higher signal-to-noise ratio corresponds to a reduced "random walk" characteristic, as will be appreciated by those skilled in the art. The polarization analyzer 133 in one example is configured closer to a full extinction point of the detection light 130 (i.e., 90 degrees) and generally between 45 degrees and 90 degrees. In one example, a brighter detection light (i.e., one with more photon flux) corresponds to a higher optimum angle (e.g., closer to 90 degrees). The optimum orientation angle of the polarization analyzer 133 in one example is determined empirically. In alternative implementations, an algorithm or mathematical model may be used to determine the optimum angle. Referring to FIG. 5, the polarization axis 233 in one example is selected to be 80 degrees relative to the polarization axis 213.

The apparatus 100 in one example comprises a plurality of components such as one or more of electronic components, hardware components, and computer software components. A number of such components can be combined or divided in the apparatus 100. One or more components of the apparatus 100 may employ and/or comprise a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 136 of the processor 134. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A nuclear magnetic resonance (NMR) gyroscope apparatus, comprising:
  a polarization filter that comprises a first polarization axis; and
  a polarization analyzer that comprises a second polarization axis;
  wherein the polarization filter is configured to polarize detection light from a NMR cell along the first polarization axis;
  wherein the polarization analyzer is configured to receive the detection light from the NMR cell and pass a portion of the detection light to a processor configured for determination of angular rate information;
  wherein the portion of the detection light passed to the processor is based on an orientation of the second polarization axis relative to the first polarization axis; and
  wherein the orientation is selected in order to maximize a signal-to-noise ratio of the detection light.

2. The apparatus of claim 1, wherein the orientation comprises an angle between the first polarization axis and the second polarization axis.

3. The apparatus of claim 2, wherein the orientation is selected such that the angle between the first polarization axis and the second polarization axis is between 45 degrees and 90 degrees.

4. The apparatus of claim 1, wherein the orientation is empirically selected.

5. The apparatus of claim 1, wherein the orientation is selected based on a mathematical model or algorithm.

6. The apparatus of claim 1, wherein the polarization filter comprises an approximately linear polarization filter;
  wherein the polarization analyzer comprises an approximately linear polarization analyzer.

7. A method utilized with a nuclear magnetic resonance (NMR) gyroscope, comprising the steps of:
  polarizing detection light from an nuclear magnetic resonance NMR cell with a polarization filter, wherein the polarization filter comprises a first polarization axis;
  passing the detection light from the polarization filter through the NMR cell to a polarization analyzer;
  polarizing the detection light from the NMR cell with the polarization analyzer, wherein the polarization analyzer comprises a second polarization axis;
  orienting the polarization analyzer to change an orientation angle between the first polarization axis and the second polarization axis in order to maximize a signal-to-noise ratio of the detection light; and
  passing a portion of the detection light from the polarization analyzer to a processor configured for determination of angular rate information.

8. The method of claim 7, wherein the step of rotating the polarization analyzer comprises the step of:
  rotating the polarization analyzer to an orientation angle between 45 degrees and 90 degrees.

9. The method of claim 7, wherein the step of rotating the polarization analyzer comprises the step of:
  empirically selecting the orientation angle to maximize the signal-to-noise ratio of the detection light.

10. The method of claim 7, wherein the step of rotating the polarization analyzer comprises the step of:
  selecting the orientation angle through employment of a mathematical model or algorithm to maximize the signal-to-noise ratio of the detection light.

11. The method of claim 7, wherein the step of polarizing the detection light for the NMR cell with the polarization filter comprises the step of:
  polarizing the detection light with an approximately linear polarization filter;
  wherein the step of polarizing the detection light from the NMR cell with the polarization analyzer comprises the step of:
    polarizing the detection light from the NMR cell with an approximately linear polarization analyzer.

12. A manufactured article that is compatible with a nuclear magnetic resonance (NMR) gyroscope, comprising:

one or more computer-readable non-transitory media adapted and constructed in order to process electrical signals via a processor in order to obtain angular rate information from an NMR gyroscope, comprising:
- a polarization filter that comprises a first polarization axis; and
- a polarization analyzer that comprises a second polarization axis;
- wherein the polarization filter is configured to polarize detection light from an NMR cell along the first polarization axis;
- wherein the polarization analyzer is configured to receive the detection light from the NMR cell and pass a portion of the detection light to a processor configured for determination of angular rate information;
- wherein the portion of the detection light passed to the processor is based on an orientation of the second polarization axis relative to the first polarization axis; and
- wherein the orientation is selected in order to maximize a signal-to-noise ratio of the detection light.

* * * * *